United States Patent
Wolman et al.

(10) Patent No.: US 8,266,634 B2
(45) Date of Patent: Sep. 11, 2012

(54) RESOURCE ASSIGNMENT SYSTEM WITH RECOVERY NOTIFICATION

(75) Inventors: Alastair Wolman, Seattle, WA (US); Atul Adya, Bellevue, WA (US); John D. Dunagan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1291 days.

(21) Appl. No.: 11/958,392

(22) Filed: Dec. 18, 2007

(65) Prior Publication Data

US 2009/0100441 A1    Apr. 16, 2009

Related U.S. Application Data (60) Provisional application No. 60/998,727, filed on Oct. 12, 2007.

(51) Int. Cl.
*G06F 13/00* (2006.01)
(52) U.S. Cl. ......... 719/318; 718/104; 709/224; 709/226
(58) Field of Classification Search .................. 719/318; 718/104; 709/224, 226
See application file for complete search history.

(56) References Cited

U.S. PATENT DOCUMENTS

| | | | |
|---|---|---|---|
| 5,701,480 A | 12/1997 | Raz | |
| 6,144,983 A | 11/2000 | Klots | |
| 6,775,703 B1 | 8/2004 | Burns | |
| 6,862,666 B2 | 3/2005 | Chong | |
| 6,917,976 B1 | 7/2005 | Slaughter et al. | |
| 7,124,131 B2 | 10/2006 | Guthridge et al. | |
| 7,171,590 B2 * | 1/2007 | Kadoi | 714/48 |
| 7,272,664 B2 | 9/2007 | Arimilli et al. | |
| 7,458,082 B1 | 11/2008 | Slaughter | |
| 7,685,144 B1 | 3/2010 | Katragadda | |
| 7,774,782 B1 | 8/2010 | Popescu | |
| 7,962,915 B2 * | 6/2011 | Eshel et al. | 718/105 |
| 2001/0000812 A1 * | 5/2001 | Waldo et al. | 709/225 |
| 2002/0078213 A1 | 6/2002 | Chang | |
| 2003/0023826 A1 | 1/2003 | McMichael | |
| 2003/0041141 A1 | 2/2003 | Abdelaziz | |
| 2003/0105882 A1 | 6/2003 | Ali | |
| 2004/0215905 A1 | 10/2004 | Armstrong | |
| 2005/0108362 A1 | 5/2005 | Weinert | |
| 2005/0114291 A1 | 5/2005 | Becker-Szendy | |
| 2005/0203962 A1 | 9/2005 | Zhou | |
| 2005/0235289 A1 | 10/2005 | Barillari | |
| 2005/0240621 A1 | 10/2005 | Robertson | |
| 2005/0289098 A1 | 12/2005 | Barsness | |
| 2005/0289240 A1 | 12/2005 | Cheshire et al. | |
| 2006/0015507 A1 | 1/2006 | Butterworth et al. | |
| 2006/0036896 A1 | 2/2006 | Gamache | |
| 2006/0136369 A1 | 6/2006 | Douceur et al. | |
| 2006/0168154 A1 | 7/2006 | Zhang et al. | |

(Continued)

OTHER PUBLICATIONS

"Adaptive Soft-State Protocol in Replica Location Services",, at least as early as Sep. 26, 2007, 6 pages.

(Continued)

*Primary Examiner* — Andy Ho
(74) *Attorney, Agent, or Firm* — Westman, Champlin & Kelly, P.A.

(57) ABSTRACT

The application discloses a resource assignment system including recovery notification procedures or methods to notify an application or node of potentially lost resources. The recovery notification procedures or calls are invoked in response to a recovery notification registration function. In response to recovery notification registration, a recovery notification or call is generated to report lost resources.

20 Claims, 7 Drawing Sheets

U.S. PATENT DOCUMENTS

2006/0184528 A1     8/2006    Rodeh
2007/0043771 A1*   2/2007    Ludwig et al. ................ 707/200
2007/0271365 A1    11/2007   Revanuru

OTHER PUBLICATIONS

Chervenak, et al., "Giggle: A Framework for Constructing Scalable Replica Location Services", University of Southern California, Marina del Rey, CA, IEEE, at least as early as Sep. 26, 2007; 17 pages.

Mahalingam, et al., "Data Migration in a Distributed File Service", CA, USA, -2001-128.ps, 11 pages.

Yun, et al., "Sharp: An Architecture for Secure Resource Peering", Date: Oct. 19-22, 2003, New York, USA; 16 pages.

Gray et al., "Leases: An Efficient Fault-Tolerant Mechanism for Distributed File Cache Consistency", Computer Science Department, Stanford University, at least as early as Sep. 26, 2007; pp. 202-210.

Burrows, Mike; "The Chubby lock service for loosely-coupled distributed systems", Google Inc., at least as early as Sep. 26, 2007; 16 pages.

Prosecution History for U.S. Appl. No. 11/958,388, filed Dec. 18, 2007.

* cited by examiner

PRM Lease Table /–150

| Bucket or SummaryKeyRange | Lease Version | Expiry Time | NodeAddress |
| --- | --- | --- | --- |
| 0-5 | 0 | 12:00:20 | 1.1.1.1:3000 |
| 6-10 | 1 | ———— | ———— |
| 11-15 | 0 | 12:00:20 | 1.1.1.1:3000 |

*Fig. 7*

Owner Library Lease Table /152

| Bucket or SummaryKeyRange | Lease Version | Expiry Time |
| --- | --- | --- |
| 0-5 | 0 | 12:00:15 |
| 11-15 | 0 | 12:00:15 |

Lookup Library Cache 160

| Bucket | NodeAddress |
|---|---|
| 0-5 | 1.1.1.1 : 3000 |
| 6-10 | 2.2.2.2 : 4000 |
| 11-15 | 1.1.1.1 : 3000 |
| 16-20 | 2.2.2.2 : 4000 |

*Fig.10*

PRM Bucket Crash Table 164

| Time | Buckets |
|---|---|
| 12 : 00 : 02 | 0-5, 20-27 |
| 12 : 00 : 05 | 30-34, 40-42, 51-60 |

*Fig.11*

PRM Cache of Lookup Libraries 174

| NodeAddress | TimeLastHeardFromNode |
|---|---|
| 1.1.1.1 : 3000 | 12 : 00 : 01 |
| 2.2.2.2 : 4000 | 12 : 00 : 03 |

*Fig.12*

RESOURCE ASSIGNMENT SYSTEM WITH RECOVERY NOTIFICATION

CROSS REFERENCE TO RELATED APPLICATION

This application claims priority to provisional application Ser. No. 60/998,727 filed Oct. 12, 2007 and entitled "A LEASE MANAGEMENT SYSTEM WITH RECOVERY NOTIFICATION".

BACKGROUND

Communication or messaging devices such as desktop personal computers, mobile computing devices or cellular phones access or retrieve data from a remote data center including one or more owner nodes or servers.

In some circumstances, access to the resources will be interrupted or particular resources or data will become lost. In such circumstances, the loss or unavailability of data is not communicated to an entity that could restore the data.

SUMMARY

Embodiments of the application provide a resource assignment system including recovery notification procedures or methods to notify an application or node of potentially lost resources or buckets. As disclosed in illustrated embodiments, the recovery notification procedures or calls are invoked in response to a recovery notification registration function. In response to recovery notification registration, a recovery notification call is generated to report lost resources or buckets to the application or node.

DETAILED DESCRIPTION

Figure 1:
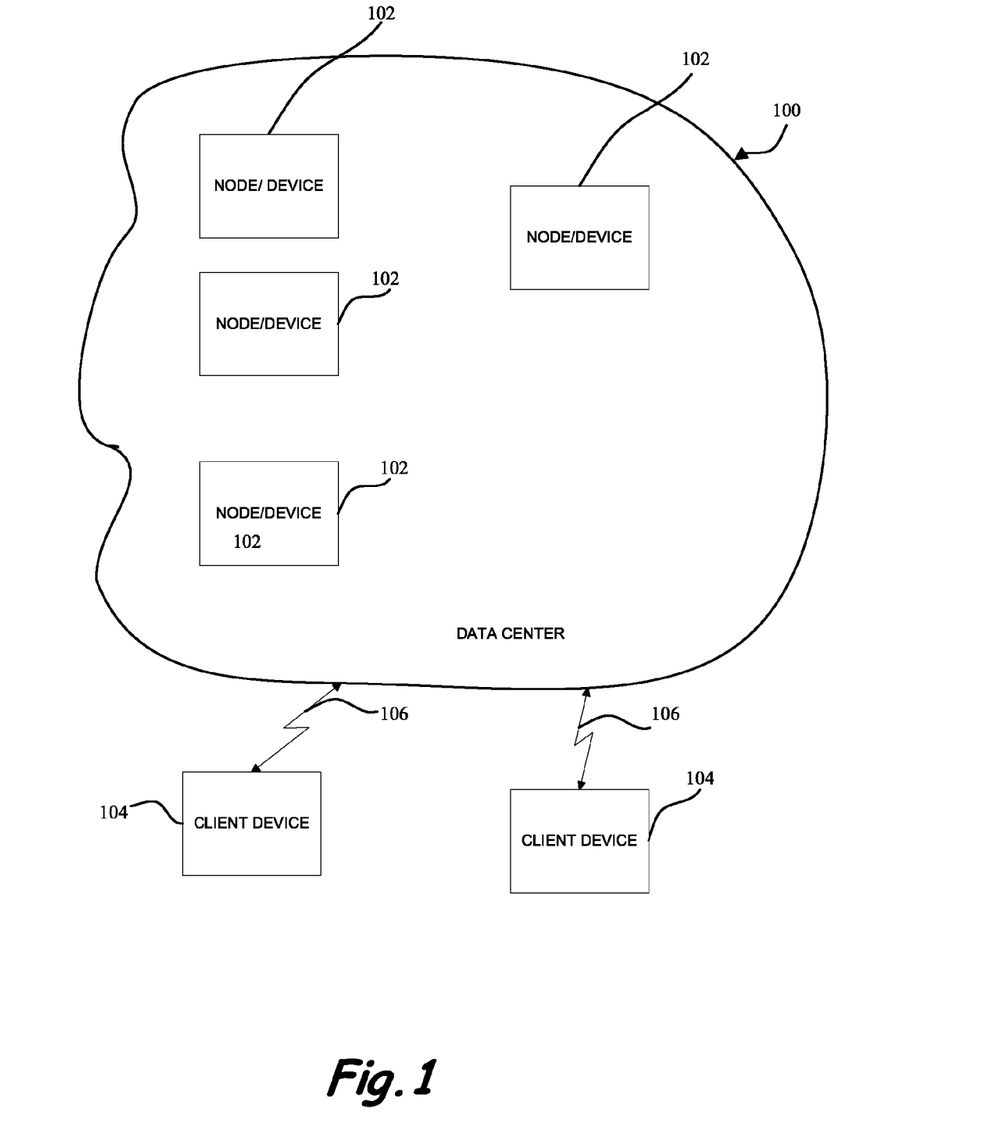
FIG. 1 is a schematic illustration of a data center in which embodiments described in the application are utilized.

FIG. 1 schematically illustrates a data center 100 for processing and storing data implementable on a computer readable medium. As shown, the data center 100 includes one or more nodes or servers 102. As shown, one or more clients or devices 104 such as desktop personal computers, mobile computing devices, cellular phones, or other computing devices communicate with the data center 100 via a communication interface 106 such as a wired network interface, a wireless network interface, or some other network interface.

Figure 2:
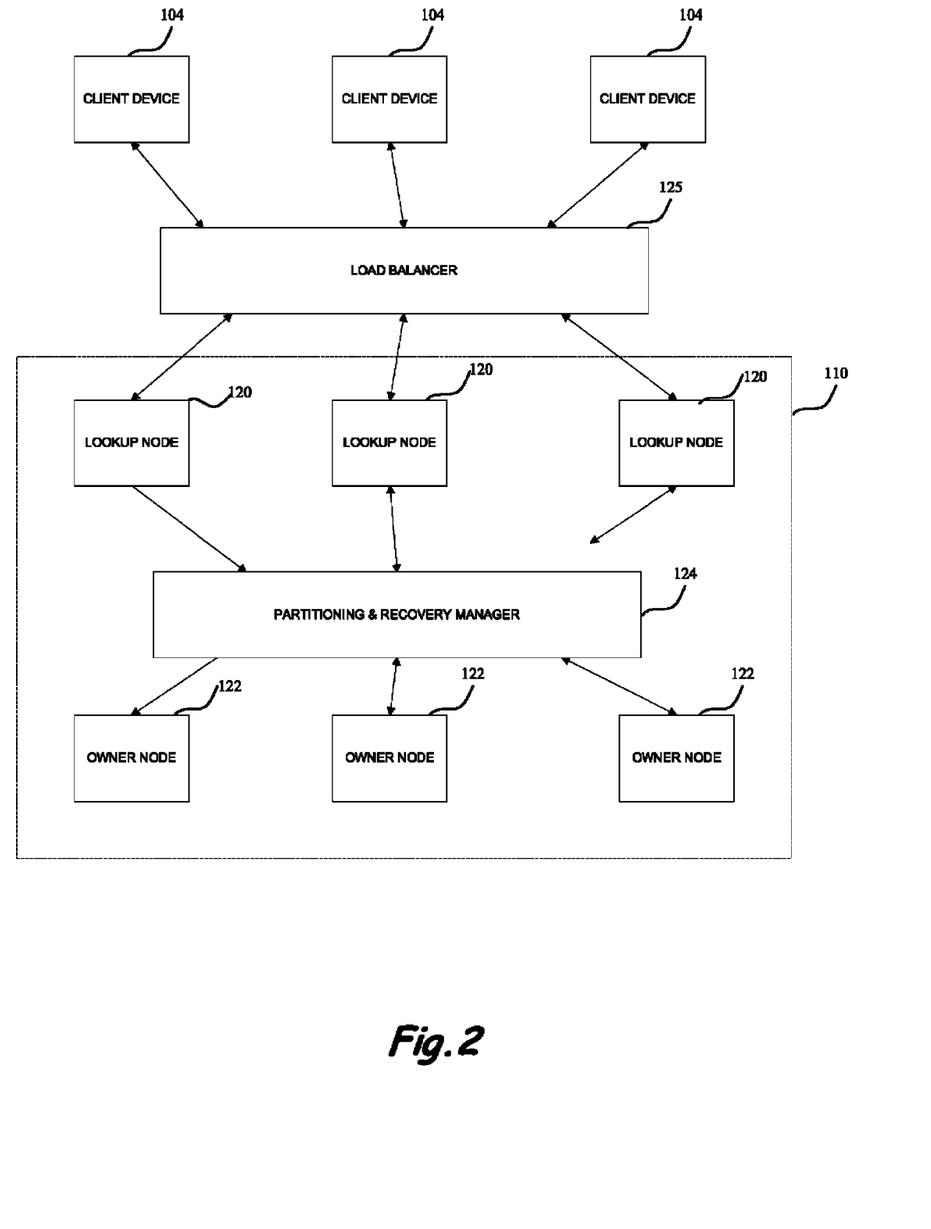
FIG. 2 is a schematic illustration of a data center including a plurality of lookup nodes that interface with a plurality of owner nodes through a partitioning and recovery manager.

In an illustrated embodiment shown in FIG. 2, the data center or system 100 includes one or more clusters 110 of nodes or devices (only one cluster is shown in FIG. 2). The nodes or devices are computing devices or servers that execute computer readable instructions. As shown, the cluster 110 includes one or more lookup nodes 120, one or more owner nodes 122 and a manager component, which in the illustrated embodiment includes a partitioning and recovery manager 124. The partitioning and recovery manager 124 is configured to partition data or objects on the one or more owner nodes or devices 122.

In the illustrated embodiment, the one or more client devices 104 communicate with the data center 100 through the one or more lookup nodes 120 via a load balancer 125. The load balancer 125 directs or distributes incoming operations or messages across the nodes 120. Thus, in an illustrated embodiment, the lookup nodes 120 and the owner nodes 122 communicate using a communication layer. Furthermore, in an illustrated embodiment, the owner nodes 122 define a storage layer. In embodiments described herein, the lookup nodes 120 and owner nodes 122 interface through the partitioning and recover manager 124 for the purpose of partitioning resources and delivering recovery notifications.

Figure 3:
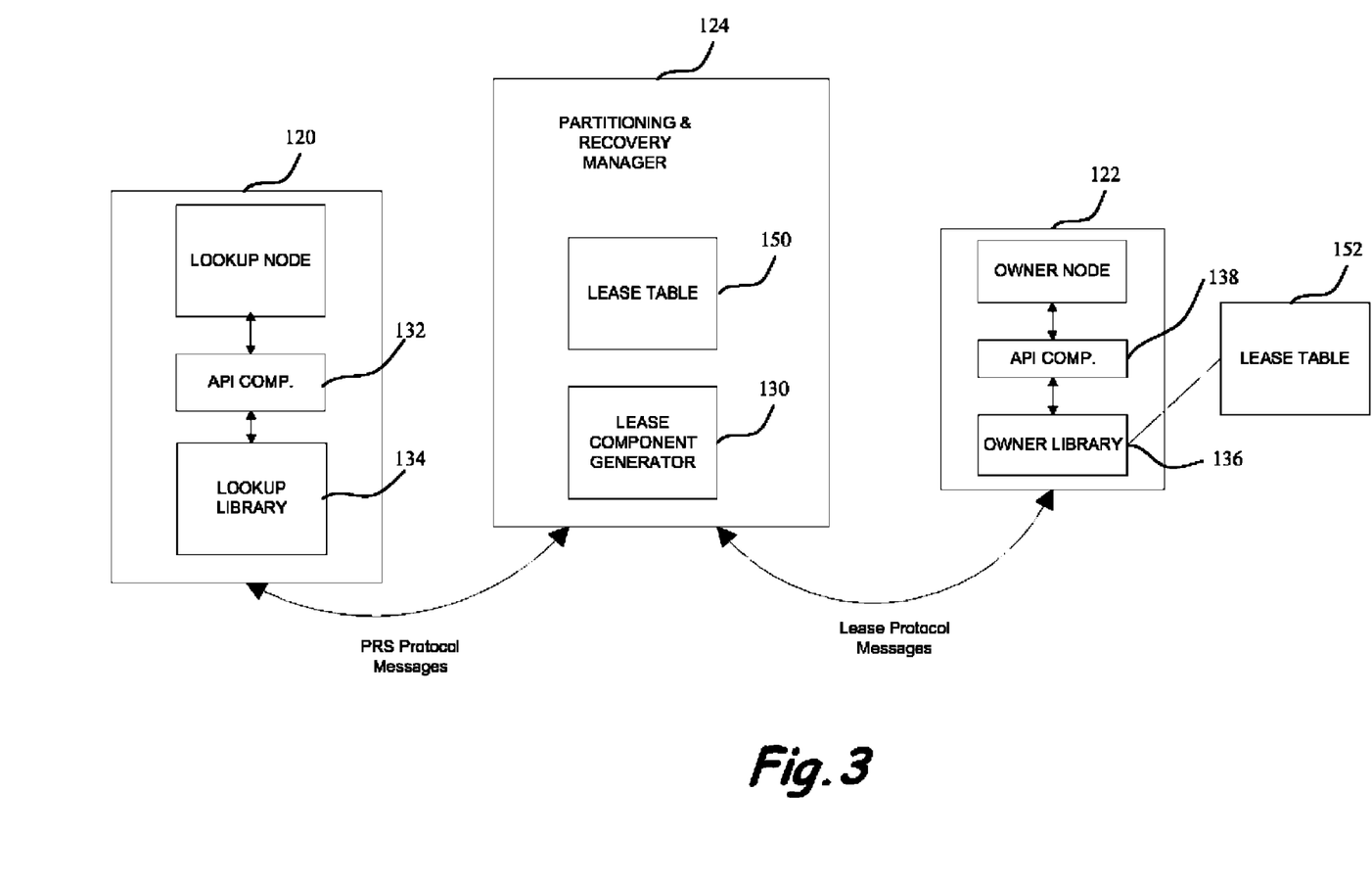
FIG. 3 is a schematic illustration of a partitioning and recovery manager and lookup nodes and owner nodes.

In the embodiment illustrated in FIG. 3, the partitioning and recovery manager 124 allocates ownership of resources or data to the one or more owner nodes 122. In particular, in the embodiment shown in FIG. 3, the partitioning and recovery manager 124 allocates ownership via leases although application is not limited to use of leases. In some traditional lease management systems, the requester of the lease specifies which items it is interested in receiving a lease on. In an illustrated embodiment described herein, the requester of the lease specifies a general interest in being assigned some leases, and the partitioning manager 124 assigns it the appropriate leases so as to partition resources appropriately across the system. This role for the partitioning manager 124 is referred to as the partitioning manager being responsible for assigning ownership.

As shown, leases are generated via a lease generator component 130 based upon load measurements and other status of the one or more owner nodes 122, such as the liveness status. Data may be described as either soft state data, data that is likely to be lost in the event of a routine failure, such as the crash of an individual computer, or hard state data, data that is unlikely to be lost except in the event of a catastrophic failure, such as the data center 100 being hit by a meteor.

In the illustrated embodiment, the lease generator component 130 generates leases for soft state data or other resources. In an alternative embodiment, the lease generator component 130 generates leases for hard state data or other resources. The leases illustratively include a lease time frame or expiration and a lease version as described in more detail in the application.

Although in the embodiment described, ownership is allocated via leases, application is not limited to a lease-based system and embodiments described herein can be implemented on a non-lease based system. In another embodiment, the owner nodes 122 request ownership of a lease for a particular resource or bucket and the partitioning and recovery manager 124 assign ownership based upon the owner node's request 122.

The lookup node 120 is configured to lookup partitioned resources on behalf of requests initiated by the client devices 104. As shown in FIG. 3, the lookup nodes 120 interface with the partitioning and recovery manager 124 via methods or functions of a lookup library 132 through application program interface (API) 134. The owner nodes 122 interface with the partitioning and recovery manager 124 via methods and functions of an owner library 136 through application program interface (API) 138.

As described, the partitioning and recover manager 124 is not otherwise integrated with the storage layer at the owner nodes 122 or the communication layers between the lookup nodes 120 and the owner nodes 122. By not being integrated with the storage and communication layers, the system achieves its goal of being usable in the context of many different services. To implement some new application, it is only necessary to write new code at the owner node 122 and or lookup node 120 and to use the API exposed by the lookup and owner libraries 134 and 136. Because it is not integrated with the storage and communication layers, the partitioning and recovery manager 124 communicates with the lookup nodes 120 and owner nodes 122 through communication protocols or calls described herein.

In illustrated embodiments, resources are hashed into buckets for lease generation and management. The hashed resources or objects are represented by SummaryKeys using a SummaryKeyRange or ResourceKeyRange, which stores the low and high endpoints for a hash range. A SummaryKey is a 64 bit entity that corresponds to a hash of a resource address. In one embodiment, the partitioning and recovery manager 124 maps buckets directly to servers or nodes 122.

Figure 4:
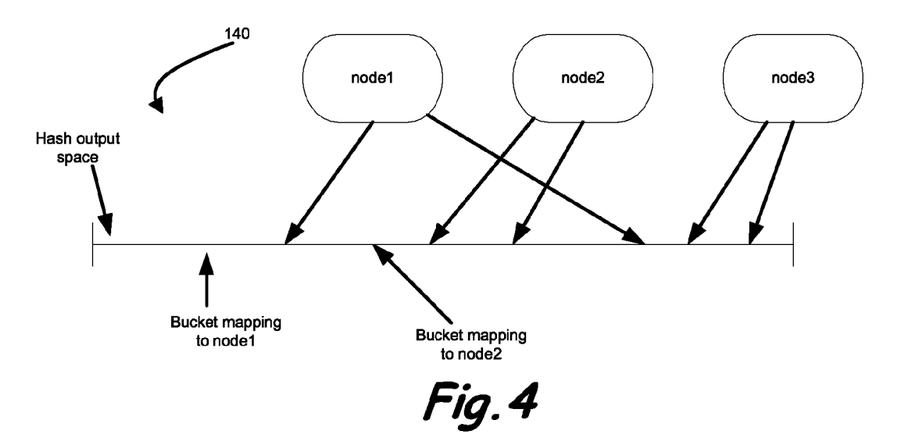
FIG. 4 is an illustrated embodiment of a hash output for a bucket or group of resources.

For example, a first fixed number of buckets are mapped to the first server or node and a second fixed number of buckets are mapped to a second server or node. The split of the hash space into buckets may be constant, with each bucket containing a constant fraction of the hash space, or the split of the hash space into buckets may be a function of the nodes currently in the system. For example, given a list of nodes (e.g. node1, node2, etc.) and a virtual node count for each node, each node is mapped to as many points in the hash output space 140 as its virtual node count as illustrated in FIG. 4. For example if node1 has a virtual node count of 3, node1 is mapped to (hash(node1:1)hash(node1:2),hash(node1:3). The buckets are the continuous ranges between any two such points in the hash output space and each bucket belongs to the node that contributed its right end point.

The consistent hashing state is simply represented using an array of tuples of the form: (<serverid or node address, virtual server count, start offset>). To obtain the range in the output space of each bucket one simply computes hash (<serverid/nodeaddress,start offset+0>), hash(,serverid>:<start offset>+1) . . . , for all serverids or node addresses and then sorts them. The values between the sorted hash values are the range of each bucket.

Figure 5:
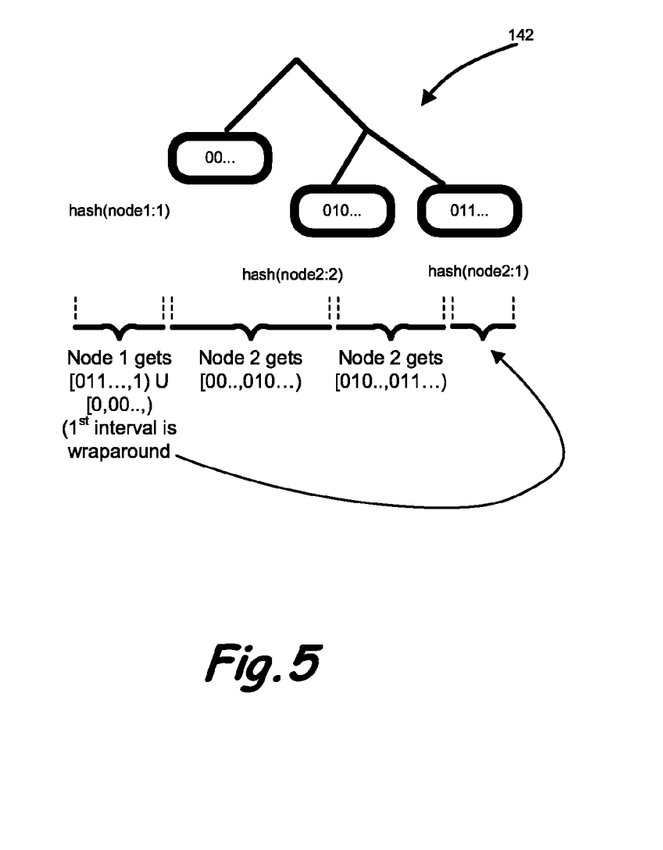
FIG. 5 illustrates a tree for hashed data structure.

In an illustrated data structure the buckets are represented using a binary tree 142 as illustrated in FIG. 5. This requires one insertion into a binary tree for each virtual node (node X's Yth virtual node requires inserting hash (nodeX:Y). Once all the insertions have been done, each range between two leaves of the tree is assigned to the right hand successor leaf node as illustrated in FIG. 5. In one embodiment a SHA1 (Secure Hash Algorithm #1) is used, although application is not limited to a particular embodiment described. Although a consistent hashing technique is described, application is not limited to any particular hashing technique or bucketization approach. For example in another embodiment the system uses a bucketization that implements both consistent and/or fixed hashing.

Figure 6:
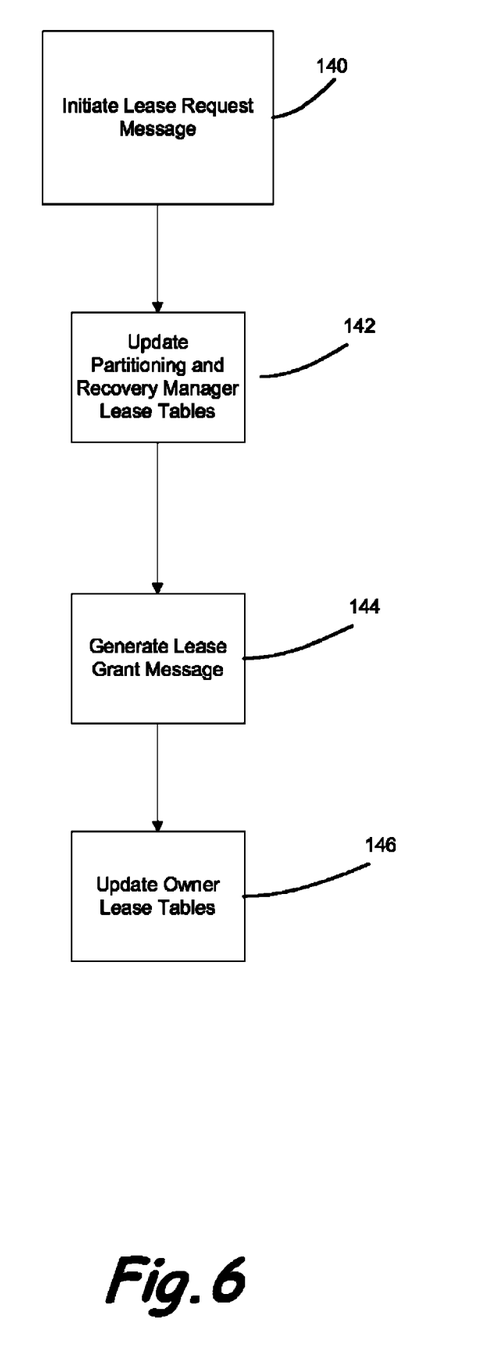
FIG. 6 is a flow chart illustrating a message protocol or procedure to generate leases for resources or buckets of resources.

As previously described, the partitioning and recovery manager 124 communicates with the one or more owners libraries 136 to generate the leases for buckets or resources. FIG. 6 illustrates an embodiment of a message sequence for generating leases for the buckets or resources. In an illustrated embodiment, a bucket including a SummaryKeyRange and lease version is defined using the following struct:

```
Struct VersionedBucket{
    SummaryKeyRange bucket
    uint leaseversion
}
```

As illustrated in step 140, the owner node 122 will initiate a lease request message. In one embodiment, the lease request message has the following format.

```
Struct LeaseRequestMSg {
    List<VersionedBucket> leasesToExtend
    DateTime  ownerTimeWhenInitiateRequest
}
```

Figure 7:
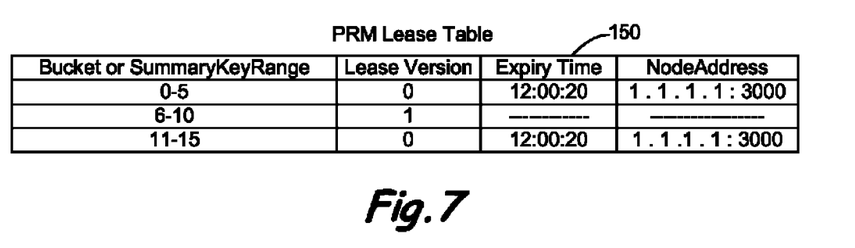
FIG. 7 illustrates an embodiment of a lease table of the partitioning and recovery manager.

As illustrated in step 142 of FIG. 6, in response to the lease request message, the partitioning and recovery manager decides on the leases to grant to the owner node, and the new leases are written to the partitioning and recovery manager 124's lease table 150 shown in FIG. 7.

As illustrated in FIG. 6, in response to the lease request message, the partitioning and recovery manager 124 generates a lease grant message as shown in step 146 as follows.

```
Struct LeaseGrantMsg {
    List<VersionedBucket> leasesToExtend
    List<VersionedBucket> leasesToGrant
    DateTime   ownerTimeWhenInitiateRequest
    TimeSpan   leaseDuration
}
```

The lease grant message includes the lists of versioned buckets "leases to grant" and "leases to extend". As shown, the message format utilizes a compact data structure to provide a single message that includes a complete list of the leases held by the owner node 122. Any lease not mentioned in the message is interpreted as not being held or assigned to the owner node 122.

Since the lease message includes the entire lease state of an owner node 122 in a single message, the lease message is self-describing. Because it is self-describing, there is no need to send incremental lease updates to an owner library 136; the partitioning and recovery manager 124 sends all lease grants for the library in every message. Self-describing leases messages facilitate resource moves for load balancing, and real-locating ownership when new servers are brought online or servers are removed or crash, avoiding many of the protocol complexities faced by incremental lease updates.

Figure 8:
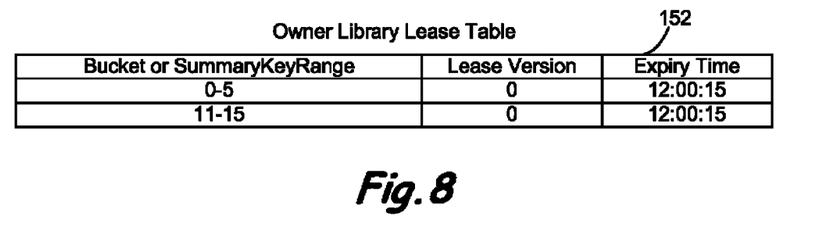
FIG. 8 illustrates an embodiment of an owner library lease table.

In step 146, the owner library lease table 152 is updated as illustrated in FIG. 8.

FIG. 7 illustrates an embodiment of a partitioning and recovery manager (PRM) lease table 150. As shown in the illustrated embodiment of FIG. 7, the lease table 150 includes bucket or summary key range, lease version, expiry time and node address for the owner node 122 to which the lease is assigned. If no owner holds the lease, the node address is empty as shown.

FIG. 8 illustrates an embodiment of the owner library's lease table 152. As shown in the embodiment illustrated in FIG. 8, the owner library lease table 152 includes bucket or summarykeyrange, lease version and expiry time. The lease provided to the owner node 122 never covers any items that are simultaneously covered by a lease at another node, and thus no two owner libraries 136 simultaneously believe they own any given bucket. This provides "single-copy semantics" or "single-copy serializability". The partitioning and recovery manager 124 may err by thinking an owner node has a bucket when it does not, but the owner node 122 will never have a bucket when the partitioning and recovery manager 124 thinks it does not. As described, at any given time, a resource or bucket is owned by at most one owner node 122.

Figure 9:
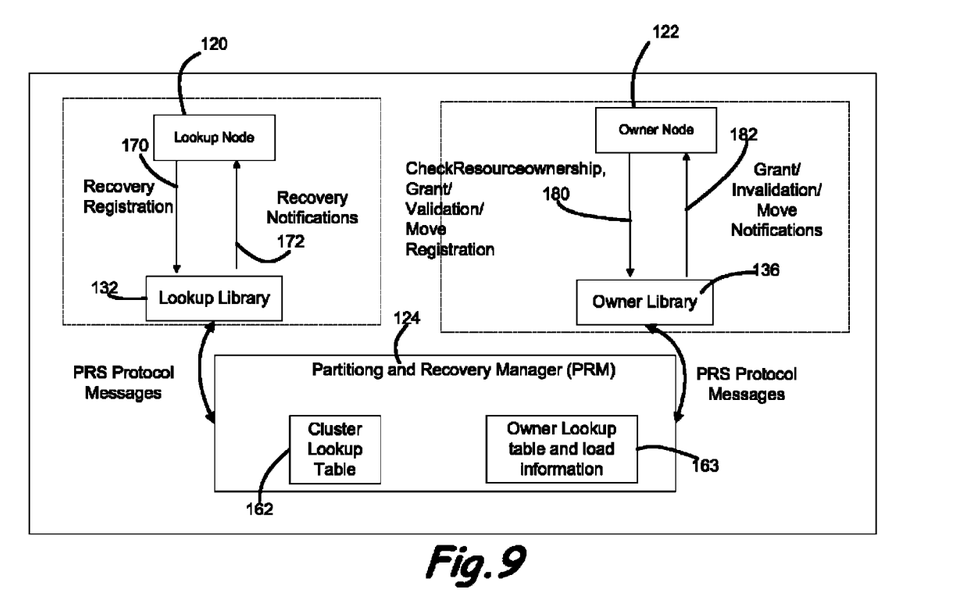
FIG. 9 illustrates an embodiment of a data center including a partitioning and recovery manager and a lookup node and owner node.
Figure 10:
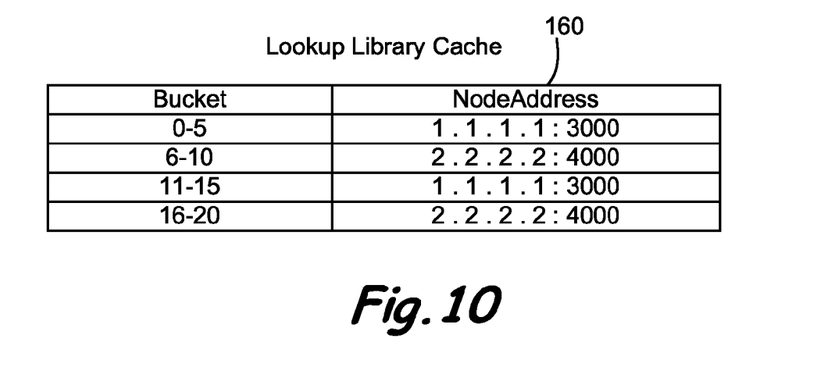
FIG. 10 illustrates an embodiment of a lookup library cache table.

In the illustrated embodiment shown in FIG. 9, the lookup library 132 is configured to lookup partitioned resources and also deliver recovery notifications to lookup nodes as shown in FIG. 9. The lookup library 134 exposes lookup methods to get location information about the resources. The lookup library 132 is internally structured to use a queue-based or event-driven programming model where an event loop processes tasks placed in a work queue. Operationally lookup calls are made to lookup library 132 to check in its memory cache 160 (as shown in FIG. 10) for address information. If the address information is not present the lookup library 132 queries the partitioning and recovery manager 124 as described herein and caches the results before returning the results to the lookup node 120.

A lookup call is initiated as follows.

```
void Lookup(
    ResourceAddress address,
    bool isRetry,
    LookupOutputHandler lookupHandler)
```

The lookupHandler supplies the following method for returning the results:

```
CreateLookupOutputEntry(
    ResourceAddress inputAddress,
    LookupResult result,
    ResourceAddress outputAddress);
```

An example interface or lookup method results include:

```
enum LookupResult {
    ResolveSucceeded,
    AlreadyFullyResolved,
    CannotResolveLocally,
    Failed
}
```

In the type or method above—ResolveSucceeded indicates that the address was resolved with more location information. AlreadyFullyResolved indicates that no further location information that the partitioning and recovery manager 124 can provide. CannotResolveLocally indicates that the caller can try resolution at a different (remote) entity e.g. the cluster specified is not the current cluster. Failed indicates that it could not resolve, e.g. the lookup library could not contact the partitioning and recovery manager.

When the lookup node 120 attempts to use the lookup library to further resolve a resource address, it may additionally specify IsRetry, a hint that the caller has recently performed a lookup on the same address and the resulting address turned out to be incorrect. When the lookup is done, the lookup library 132 schedules a lookupHandler on the caller's work queue with the appropriate lookup result about whether the call succeeded, and if so, the new address information.

In an illustrated embodiment, the data center or system 100 uses a hierarchical resource address methodology. The methodology includes ResourceAddress, GlobalResourceAddress, ClusterLevelResourceAddress and NodeLevelResourceAddress. The ResourceAddress is an abstract class to denote all resources of the system.

The GlobalResourceAddress is a location independent address that essentially corresponds to a generic resource name. The ClusterLevelResourceAddress is a location dependent address specifying the cluster 110 but not the particular owner node 122 within the cluster 110. The NodeLevelResourceAddress is a location dependent address specifying the particular owner node 122.

If a client device 104 passes in a GlobalResourceAddress, the lookup library 132 attempts to resolve it to a ClusterLevelResourceAddress. If the client device passes in a ClusterLevelResourceAddress the lookup library will verify if the cluster is the correct and if so, the lookup library 132 will attempt to resolve it to a node level resource address. If the client device 104 passes in a NodeLevelResourceAddress, the library does not further resolve the address. Although three hierarchical levels are present in the illustrated embodiment, application is not limited to the illustrated embodiments shown.

In the illustrated embodiment, in response to a lookup call, the lookup library checks the lookup library cache 160 as illustrated in FIG. 10 to determine if a summarykeyrange or bucket for a resource is in any cached ranges and if it is not, it generates a lookup message to the partitioning and recovery manager 124. In an illustrated embodiment, the lookup message format for the partitioning and recovery manager 124 is:

```
Struct LookupRequestMsg {
    GlobalResourceAddress key
    Bool noKnownPRMTime
    ulong lastPRMTime
}
```

The lastPRMTime is the time that the lookup library received in a previous LookupResponse message from the partitioning and recovery manager 124.

As shown in FIG. 9, the partitioning and recovery manager 124 includes a cluster lookup table 162 and owner lookup table 163. In response to the lookup request message, the partitioning and recovery manager checks the lookup tables 162, 163 to resolve the address. Next, the partitioning and recovery manager 124 generates a lookup response, which in an illustrated embodiment includes a complete mapping of buckets to nodes and a list of the buckets that have crashed.

Figure 11:
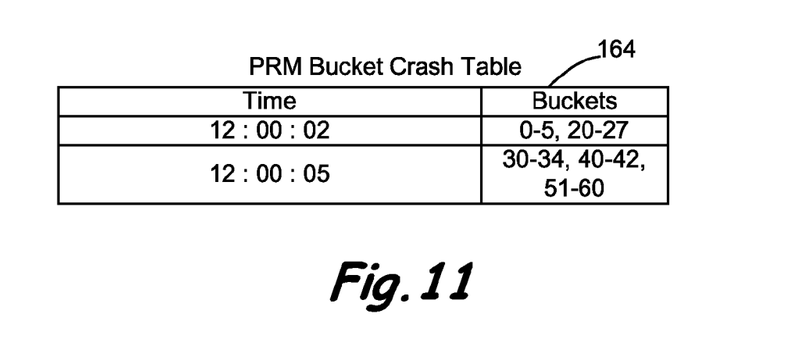
FIG. 11 illustrates an embodiment of a partitioning and recovery manager bucket crash table.

The list of buckets crashed is constructed from a partitioning and recovery manager bucket crash table 164 illustrated in FIG. 11. The lookup library then updates a cache with a mapping of the buckets that have crashed. This information is used to generate recovery notification calls as described herein.

In an illustrated embodiment once the application receive the lookup result or address, an application or device 104 can contact or communicate with the owner node 122 directly without communicating through the partitioning and recovery manager 124 to retrieve the resource data.

As illustrated in FIG. 9, messages between the lookup library 132 and the partitioning and recovery manager 124 communicate directly using a messaging layer or component. The lookup library 132 records metadata from earlier communications between the lookup library 132 and the partitioning and recovery manager 124 to detect crashes of the partitioning and recovery manager 124.

In the illustrated embodiment shown in FIG. 9, the lookup library includes a recovery notification function. The recovery notification function is initiated via the following API or methods as illustrated by line 170 as follows:

```
void RegisterForRecoveryNotification(
    ResourceAddress address,
    RecoveryHandler recoveryHandler);
```

The recoveryHandler supplies the following method for returning the results to the lookup nodes via a recovery notification callback as illustrated by line 172 as follows:

```
CreateRecoveryNotificationEntry(
    ICollection<SummaryKeyRange> recoverRanges);
```

As previously described, the lookup node may not automatically learn that a resource or bucket is lost. In illustrated embodiments, the recovery notification registration function provides a call or notification as illustrated by line 172 in FIG. 9 to the lookup node 120 when a resource or bucket is potentially lost.

Recovery notification calls at the lookup library are initiated for crashed buckets after the lookup library 134 has learned about crashed buckets recorded in the partitioning and recovery manager crash table 164 shown in FIG. 11. Additionally, recovery notifications calls could be invoked by any of the following events 1. The partitioning and recovery manager or manager component 124 in the cluster where the resource lives is unreachable by the local lookup library 132, or it has crashed and restarted.
2. The partitioning and recovery manager or manager component 124 in the cluster where the resource lives loses touch with the resource owner node 122 (and hence cannot do a lease renewal).
3. The partitioning and recovery manager or manager component 124 in the cluster where the resource lives asks the resource owner node 122 to initiate a move and the move fails.

Figure 12:
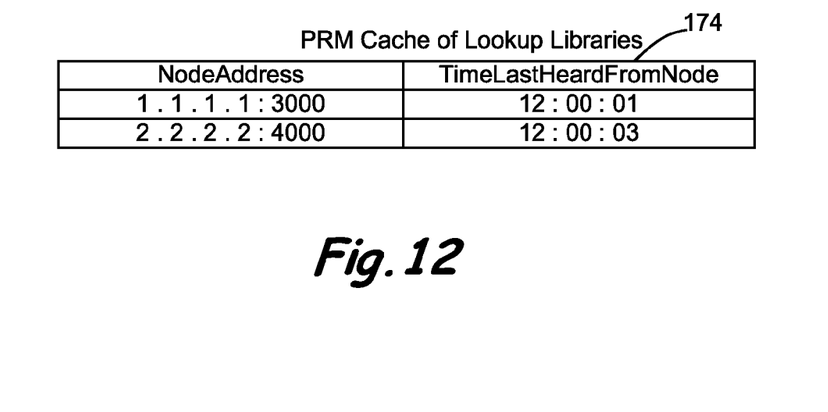
FIG. 12 illustrates a partitioning and recovery manager cache of lookup libraries.

In one embodiment, the partitioning and recovery manager 124 is configured to periodically interface with the lookup libraries 132 to update the lookup library 132 and library cache with data relating to the partitioned resources. In particular, in one embodiment, the partitioning and recovery manager 124 initiates communication with the lookup libraries 132 to notify the lookup libraries 132 of crashed resources or buckets. As illustrated in FIG. 12, the partitioning and recovery manager 124 maintains a cache or table 174 of the time of last communication with the lookup libraries 134.

The owner library 136 is configured to store partitioned resources or buckets. The owner node 122 interfaces with the partitioning and recovery manager 124 through the owner library 126 as previously illustrated in FIG. 9. The owner library 136 includes implements various methods and functions to inform the owner node of ownership and indicate when to move resources due to a load imbalance or crash. The owner nodes 122 initiate calls or methods to the owner library 136 as illustrated by line 180 and receives callbacks as illustrated by line 182 to learn when ownership has been granted, when resources need to be invalidated and when resources need to be moved.

When RegisterForRecoveryNotification is called for the first time, the node 120 checks that its lookup library cache 160 is non-empty. If it is empty, the lookup library sends a LookupRequest to the partitioning and recovery manager 124. The lookup library only returns a recovery notification registration complete call to the lookup node 120 after it has received a LookupResponse. This delay is needed so that the partitioning and recovery manager's time can be obtained in the LookupResponse message, supporting the log replay and checkpoint style of protocol used by LookupReponse/LookupRequest messages. This will allow querying the partitioning and recovery manager 124 about relevant crashes for this lookup library via the lookup request message as previously described.

In an illustrated embodiment, in the absence of an affirmative validation or response from the partitioning and recovery manager 124, a recovery notification call is provided to the lookup node. In the illustrated embodiment, the system guarantees to provide a recovery notification if a resource or bucket is lost although, a recovery notification may be generated for a resource or bucket that is not in fact lost.

Whenever the portioning and recovery manager 124 increments the lease version of a bucket, it sends a LookupResponse to all the lookup libraries 120 in the cluster that have sent it a LookupRequest in the past 60 seconds. This provides rapid generation of recovery notification calls to the lookup nodes 120. As shown in FIG. 12, the partitioning and recovery manager maintains a cache of lookup library communications 174 as illustrated in FIG. 12 to track contact or communications with the lookup nodes.

Secondly, every lookup library sends the partitioning and recovery manager 124 a LookupRequest message every 30 seconds. The LookupRequest message triggers the partitioning and recovery manager 124 to send a LookupResponse. If a lookup library has not heard a LookupResponse from the partitioning and recovery manager 124 in 2 minutes, then its last 3 LookupRequests have all gone unanswered, and it should trigger recovery notifications for all SummaryKeyRanges. This event should only occur if the partitioning and recovery manager or the network is down, in which case the recovery notifications methods notify the client devices 104 that the network or data center application is down or off-line.

In an alternate embodiment recovery notification calls are sent irrespective of recovery notification registration.

As previously described, the owner library 136 is configured to store partitioned resources or buckets. The owner node 122 interfaces with the partitioning and recovery manager 124 through the owner library 126 as previously illustrated in FIG. 9. The owner library 136 includes implements various methods and functions to inform the owner node of ownership and indicate when to move resources due to a load imbalance or crash. The owner nodes 122 initiate calls or methods to the owner library 136 as illustrated by line 180 and receive callbacks as illustrated by line 182 to learn when ownership has been granted, when resources need to be invalidated and when resources need to be moved.

Illustratively, the interface or method for obtaining and validating ownership from the owner library 136 is implemented with the following call:

```
Bool TryGetOwnershipHandle(ResourceAddress key, out
  OwnershipHandle handle);
```

An Owner node checks its ongoing ownership of a resource with the following call:
bool CheckContinuousOwnership (OwnershipHandle handle). The check continuous ownership function is configured to ascertain whether the owner node currently owns and whether it has continuously owned a resource or bucket since the resource or bucket was first acquired. The function or method uses an ownership handle to return the results.

In illustrated embodiments the manager component includes a partitioning and recovery manager, however, application is not limited to specific embodiments or the resource assignment system disclosed. For example, in an illustrated embodiment, the manager component includes a leasing and recovery manager for a lease management system that generates leases in response to a specific lease request for resources.

Illustrated embodiments of the resource assignment system have applications for managing information and services for various functions of a communication network, for example, for publish-subscribe servers, queue servers, device connectivity servers, account servers, authorization servers and storage servers for publish-subscribe, general notification, authorization, device connectivity services and other services of a communication system or network, although application is not limited to these illustrated embodiments.

Embodiments and methods disclosed herein can be utilized to manage data across multiple clusters (e.g. inter-cluster partitioning) or across data centers. In particular, lookup nodes 122 can be in different clusters or data centers 100 than the partitioning and recovery manager 124. Although the subject matter has been described in language specific to structural features and/or methodological acts, it is to be understood that the subject matter of the application is not necessarily limited to the specific features or acts described above. Rather, the specific features and acts described above are disclosed as illustrated examples.

What is claimed is:

1. A resource assignment system comprising:
   a library configured to interface with resources of the resource assignment system and the library including a recovery notification function or method to generate a recovery notification call for lost resources or buckets; and
   a computer that utilizes the recovery notification call to notify client devices that are communicatively coupled to the resource assignment system that the lost resources or buckets have become unavailable.

2. The resource assignment system of claim 1 wherein the recovery notification call is generated in response to a recovery notification registration interface of the library, and wherein the resources of the resource assignment system include one or more server computers that are part of a computer network.

3. The resource assignment system of claim 1 wherein the resources of the resource assignment system are partitioned across one or more owner nodes using a partitioning manager and the library interfaces with the partitioning manager to receive data regarding the resources or learn of a communication failure with the partitioning manager and the library generates the recovery notification call based upon the data or the communication failure, and wherein the client devices include a personal computer or a mobile device.

4. The resource assignment system of claim 3 wherein the partitioning manager provides a list of crashed buckets or resources to the library and the recovery notification call is generated for the crashed buckets or resources.

5. The resource assignment system of claim 1 and comprising a recovery notification registration and in response to the recovery notification registration the library generates a message to a partitioning or lease manager to request data regarding the resources of the resource assignment system.

6. The resource assignment system of claim 1 wherein the library includes a lookup function or method to interface with a partitioning manager that partitions resources across one or more owner nodes to discover an assigned node or nodes of the resources and the library interfaces with the partitioning manager to retrieve lookup and recovery data from the partitioning manager to support the lookup function or method and the recovery notification function or method.

7. The resource assignment system of claim 6 wherein the resources or the buckets are lost if the partitioning manager is not responsive, the one or more owner nodes do not respond to a message from the partitioning manager, or a move of the resources or buckets fails.

8. The resource assignment system of claim 6 wherein the partitioning manager notifies the library in the event of a crashed bucket or resource.

9. A resource assignment system comprising:
   a manager component configured to partition resources or a bucket of resources across one or more owner nodes or grant leases for the resources or buckets; and
   a computer having an owner library that is configured to interface with the manager component to receive leases or partitioned resources or buckets, the owner library being configured to interface with the manager component so that the manager component learns of lost resources or buckets, the owner library periodically sending the manager component status requests at regular intervals, and the owner library generating a recovery notification upon the manager component not responding to the status requests.

10. The resource assignment system of claim 9 wherein the manager component caches a list of lost resources or buckets, and wherein the owner library generates the recovery notification upon the manager component not responding to a preset number of the status requests.

11. The resource assignment system of claim 10 wherein the system includes a lookup library and the lookup library is configured to receive the list of lost resources or buckets from the manager component, and wherein the manager component responds to at least some of the status requests by sending response messages to the owner library.

12. The resource assignment system of claim 11 wherein the lookup library supports a recovery notification function or method configured to provide a recovery notification call to a lookup node for one or more of the lost resources or buckets, and wherein the recovery notification notifies client devices that a network or data center application is off-line.

13. The resource assignment system of claim 12 wherein the recovery notification call is invoked in response to a recovery notification registration for one or more of the resources or buckets.

14. The resource assignment system of claim 9 wherein the manager component is one of a lease manager or a partitioning manager.

15. A computer-implemented method comprising:

maintaining a record of lost resources in a table that includes indications of the lost resources and times associated with when the resources were lost; and utilizing a computer and the record to generate recovery notifications on a node for the lost resources.

16. The method of claim 15 and comprising:

retrieving data from a manager component or owner library and processing the data to generate at least one of a response to a lookup request or the recovery notifications; and wherein the indications of the lost resources include indications of ranges of buckets.

17. The method of claim 16 wherein the data from the manager component or the owner library is processed to generate the lookup request response and the recovery notifications.

18. The method of claim 16 and further including:

using a log replay and checkpoint protocol to bring the data from the manager component or the owner library up to date to reflect changes in the data.

19. The method of claim 15 and further comprising:

delivering the recovery notifications in absence of an affirmative validation within a specified period of time that recovery is not needed or in response to a registration for recovery notification.

20. The method of claim 18 wherein resources or buckets are partitioned across one or more owner nodes via one or more leases and the changes in the data includes changes in lease version numbers and the one or more leases.

* * * * *